(12) United States Patent
Gleyzes et al.

(10) Patent No.: US 8,517,128 B2
(45) Date of Patent: Aug. 27, 2013

(54) MOTOR VEHICLE

(75) Inventors: Daniel Gleyzes, Singapore (SG); Johann Perzl, Munich (DE); Hans Fickel, Moosburg (DE); Robert Harrison, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/617,730

(22) Filed: Sep. 14, 2012

(65) Prior Publication Data

US 2013/0008733 A1 Jan. 10, 2013

Related U.S. Application Data

(63) Continuation of application No. PCT/EP2011/053894, filed on Mar. 15, 2011.

(30) Foreign Application Priority Data

Mar. 16, 2010 (DE) .......................... 10 2010 011 578

(51) Int. Cl.
*B60K 6/20* (2007.10)

(52) U.S. Cl.
USPC ...................................... 180/65.21; 180/243

(58) Field of Classification Search
USPC ............................ 180/65.2, 65.21, 65.25, 243
See application file for complete search history.

(56) References Cited

U.S. PATENT DOCUMENTS

| 2005/0161934 A1 | 7/2005 | Rife et al. |
| 2005/0284675 A1 | 12/2005 | Sanchen |
| 2012/0080253 A1* | 4/2012 | Katano et al. ................ 180/68.1 |
| 2012/0123623 A1* | 5/2012 | Nguyen ......................... 701/22 |

FOREIGN PATENT DOCUMENTS

| DE | 102 27 530 A1 | 4/2004 |
| WO | WO 2010/026347 A1 | 3/2010 |

OTHER PUBLICATIONS

Krueger, R.: "Der Focus FCEV Hybrid-Ein zukunftsweisendes Brennstoffzellenfahrzeug von Ford" .In:ATZ Jun. 2003 Jahrgang 105, S. pp. 568-573.
German Search Report dated Mar. 25, 2011 with partial English translation (nine (9) pages).

* cited by examiner

*Primary Examiner* — Tashiana Adams
(74) *Attorney, Agent, or Firm* — Crowell & Moring LLP

(57) ABSTRACT

A motor vehicle includes two drive assemblies in the form of an internal combustion engine and an electric motor. For operating the motor vehicle at low speeds, preferably in an inner-city area, a fuel cell having comparatively small dimensions provides electric energy that is supplied to the electric motor directly and/or via an electric accumulator. In this way, the motor vehicle can be moved without emissions during the operation of the fuel cell with hydrogen. For operating outside of city areas, the internal combustion engine having an accordingly higher output is available. The fuel cell is arranged in the engine compartment of the motor vehicle together with the internal combustion engine.

18 Claims, 4 Drawing Sheets

MOTOR VEHICLE

CROSS REFERENCE TO RELATED APPLICATIONS

This application is a continuation of PCT International Application No. PCT/EP2011/053894, filed Mar. 15, 2011, which claims priority under 35 U.S.C. §119 from German Patent Application No. 10 2010 011 578.9, filed Mar. 16, 2010, the entire disclosures of which are herein expressly incorporated by reference.

BACKGROUND AND SUMMARY OF THE INVENTION

The invention relates to a motor vehicle having at least two drive assemblies in the form of an internal-combustion engine and an electric motor as well as having a fuel cell for providing electric energy. Such a motor vehicle is known, for example, from German Patent document DE 102 27 530 A1.

Based on the above, it is an object of the invention to provide a motor vehicle which, while its practicality is high, makes it possible to be operated purely electrically to a limited extent, particularly without any significant limitation of the usage possibilities of the interior and of the luggage compartment in comparison to a conventional motor vehicle.

This and other objects are achieved by providing a motor vehicle having at least two drive assemblies in the form of an internal-combustion engine and an electric motor, as well as having a fuel cell for providing electric energy, wherein the internal-combustion engine and the fuel cell are arranged in an engine compartment at a front end section of the motor vehicle.

It is a central aspect of the invention to provide a comparatively small-dimensioned fuel cell in addition to an internal-combustion engine in an engine compartment existing at the front end section of the motor vehicle. This deliberate dimensioning of the fuel cell in an order of magnitude, that is preferably sized for the operation of the motor vehicle in inner-city areas, results in the possibility of arranging the internal-combustion engine as well as the fuel cell in a single compartment of the motor vehicle, specifically the engine compartment.

In this case, the current generated by the fuel cell is fed directly, or by way of a temporary storage in a storage unit for electric energy, to the electric motor. If the fuel cell is operated by use of hydrogen, which is carried along in the motor vehicle, the possibility arises of being able to move the motor vehicle in the electric operation without the emission of pollutants. For this purpose, the fuel cell is designed as a low-temperature fuel cell that is fed by means of hydrogen from a tank specifically provided for this case.

In order to be able to accommodate the fuel cell beside the internal-combustion engine in the engine compartment of the motor vehicle, the internal-combustion engine has to have a correspondingly small size and/or be arranged in a correspondingly space-saving manner. In a preferred embodiment of the invention, an internal-combustion engine is installed transversely with respect to the driving direction and drives the wheels of the front axle by way of a transmission and drive shafts.

In a preferred embodiment of the invention, the internal-combustion engine and the fuel cell are thermally decoupled from one another. In the construction as a low-temperature fuel cell with the direct feeding of hydrogen, the fuel cell can thereby be operated in the optimal temperature range to approximately 60° C.

In an advantageous further development of the invention, an arrangement of the internal-combustion engine is suitable here in such a manner that the outlet side of the internal-combustion engine faces away from the fuel cell. The internal-combustion engine is preferably arranged in the front area of the engine compartment, with a positioning of the exhaust gas manifold facing the driving direction, while the fuel cell is situated in the rear section of the engine compartment, directly in front of the so-called front wall which separates the engine compartment from the passenger compartment of the motor vehicle. The thermal shielding of the fuel cell with respect to the internal-combustion engine is facilitated by this configuration.

Fuel cell power in the order of magnitude of approximately 5 kW is sufficient for the speeds at which motor vehicles move in city areas. The range during a purely electric operation is determined by the amount of the carried-along hydrogen. For higher speeds and ranges in areas outside the city, the internal-combustion engine is provided, which is supplied from a separate tank for fuel (gasoline, diesel, natural gas). The internal-combustion engine can naturally also be operated by use of hydrogen (from a single tank).

For acceleration operations in areas within cities, which cannot be managed with sufficient dynamics by means of the current supplied directly from the deliberately small-dimensioned fuel cell, an accumulator for electric energy is provided, so that the acceleration operations can be accomplished by the use of additional electric energy from the accumulator. While a fairly small drive power is sufficient for constant travel in an area within a city, a motor vehicle designed for the transport of from four to five persons, along with a load, requires a clearly higher drive power in the acceleration phases, for example, when starting to move from a traffic light. These dynamic operating phases of the motor vehicle in the area within a city can be managed by the electric accumulator, which is configured as a temporary storage device. On the one hand, the temporary storage device is charged during constant travel by the fuel cell itself by the feeding of excessive electric energy. In addition, electric energy obtained by recuperation in the coasting operation and during the deceleration of the motor vehicle can be fed into the temporary storage device. The recuperation results in a clear improvement of the energy balance for the operation of the motor vehicle.

In a particularly advantageous manner, the storage unit is arranged in the area of the transmission tunnel, thus in the area between the two front seats. The transmission tunnel preferably extends beyond the area of the front seats toward the rear and continues in the floor area in front of the rear seats and below the rear seats. Such a transmission tunnel is generally known, for example, in the case of motor vehicles having a front engine and a rear axle drive and is used for accommodating a drive shaft (cardan shaft). In the case of motor vehicles having a drive concept without a cardan shaft, the installation space in the area of the transmission tunnel is available for other purposes, as in this case for accommodating the electric storage unit. The electric storage unit can therefore be housed in a particularly protected area of the motor vehicle, considerably protected from damage in the case of a collision of the motor vehicle because, in the event of a frontal, rear and lateral impact, the storage unit is in each case arranged far away from the impact site.

Since the electric storage unit for the operation of the motor vehicle within a city area has to accommodate only comparatively small amounts of energy, in a further aspect of the invention, the storage unit has a plurality of double layer capacitors. These capacitors, also called "supercaps" or "ultracaps", are distinguished by high robustness with respect to mechanical stress. They have a long service life and do not have to be cooled. This results in advantages, for example, in comparison to lithium ion batteries, which, although they have a higher capacitance, are clearly more sensitive and, as a rule, have to be connected to a cooling circuit. Naturally, however, lithium ion batteries can also be used, as can any other known types of accumulators for electric energy.

In a further development of the invention, at least one fuel tank is provided for a fuel cell and/or for the internal-combustion engine in the area in front of the rear axle. Just like the area of the transmission tunnel, this area is also distinguished by the fact that it is very protected from damage because, even at fairly high collision speeds, comparatively slight deformations of the vehicle structure will occur in this area. In particular, a tank for hydrogen can be accommodated in this area in a particularly secure fashion.

In a further development of the invention, the electric motor directly drives the wheels of the rear axle preferably by way of a transmission. For this purpose, the electric motor is arranged in a space-saving manner directly adjacent to the rear axle.

Additional components for operating the electric motor, such as an electronic power unit, a DC-DC converter, an inverter or other control and automatic control devices can be arranged in a particularly advantageous manner adjacent to the electric motor in that the space in the lower area of a rear luggage compartment of the motor vehicle is utilized. Although this slightly reduces the usable luggage compartment volume of the vehicle, a relatively large volume will still remain for the accommodation of the luggage, so that, in comparison to a conventional motor vehicle, the practical utility of the motor vehicle is limited only slightly.

To the extent that the above-mentioned components have to be cooled, they are connected by way of at least one cooling circuit to at least one heat exchanger, which is situated in the front area of the motor vehicle. In addition to the internal-combustion engine, mainly the electric motor, as well as the fuel cell, have to be cooled. The electronic power unit also normally requires separate heat removal as does the DC/DC converter and the inverter.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
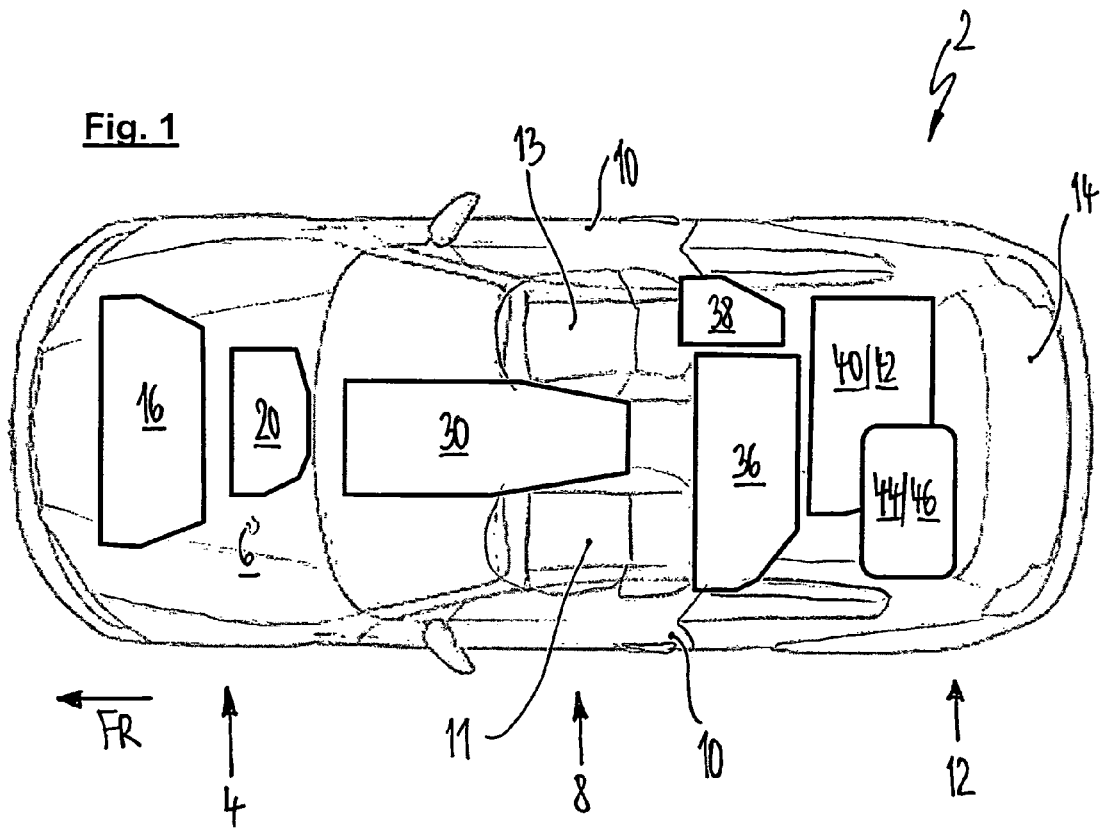
FIG. 1 is a schematic top view of a motor vehicle according to an embodiment of the invention.
Figure 2:
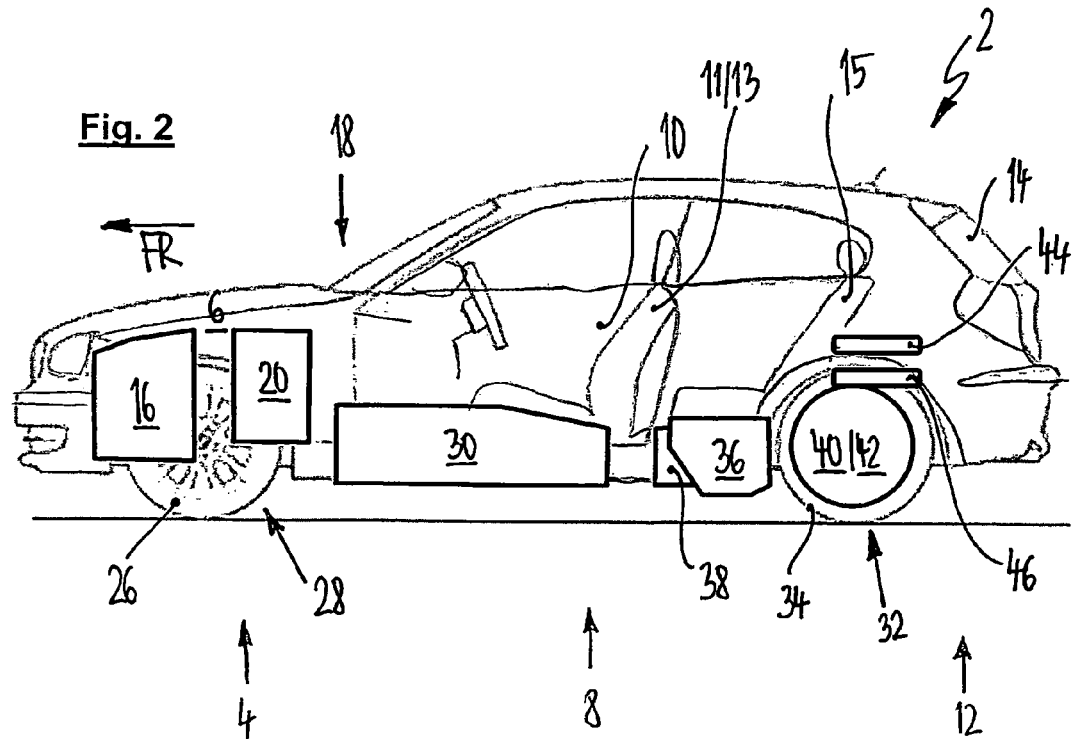
FIG. 2 is a lateral view corresponding to FIG. 1 of the motor vehicle.

Referring to FIGS. 1 and 2, a motor vehicle, which as a whole has the reference number 2, is constructed as a so-called fastback vehicle, having an engine compartment 6 in a front end 4, a passenger compartment 8, whose two doors 10 permit access to a driver's seat 11, a front passenger seat 13 and a rear seat bench 15, as well as having a luggage compartment 12 which is accessible by way of a tail gate 14. In addition to the front doors 10, the motor vehicle 2 may naturally also have rear doors.

Figure 3:
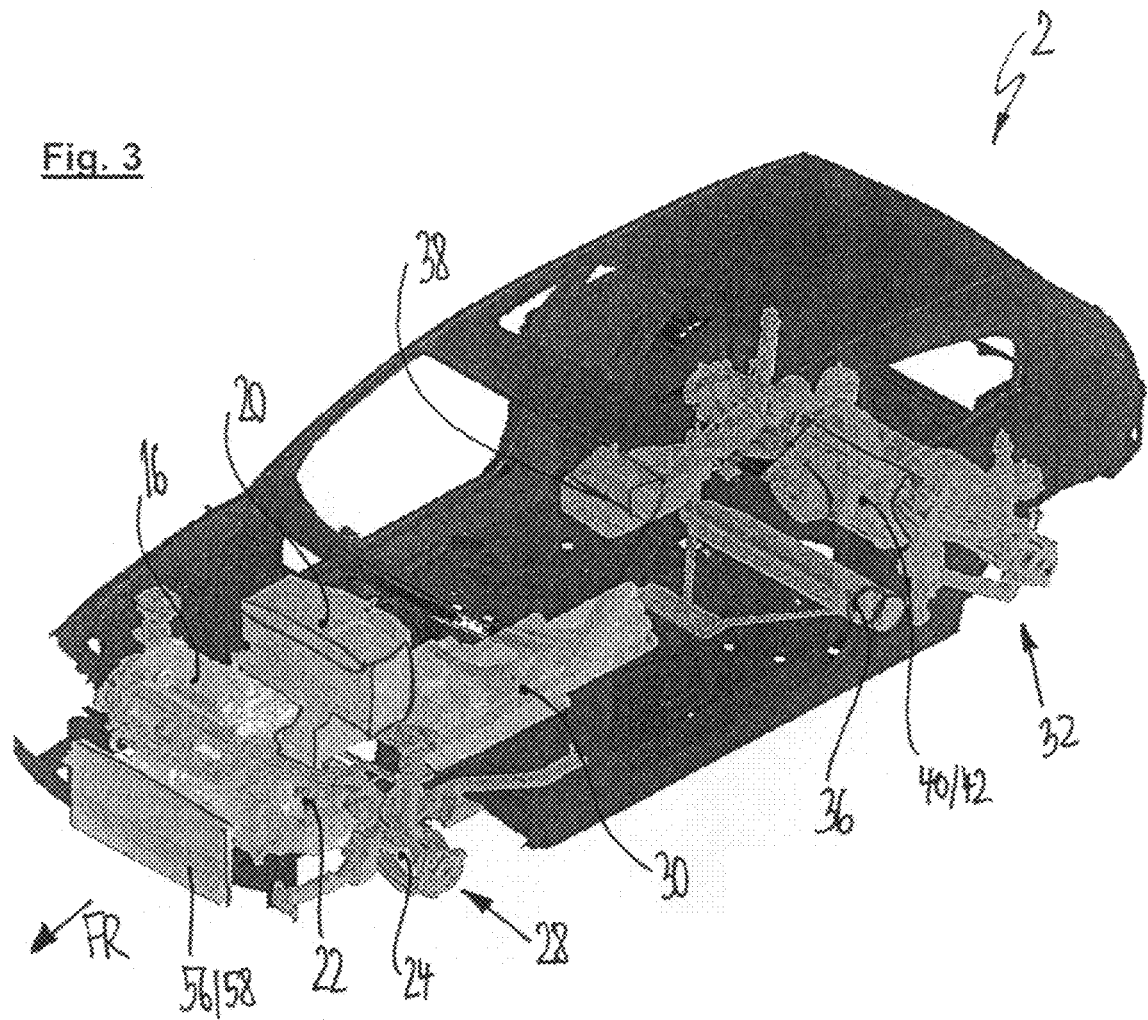
FIG. 3 is a perspective view of the motor vehicle emphasizing exemplary components relevant to the invention.
Figure 5:
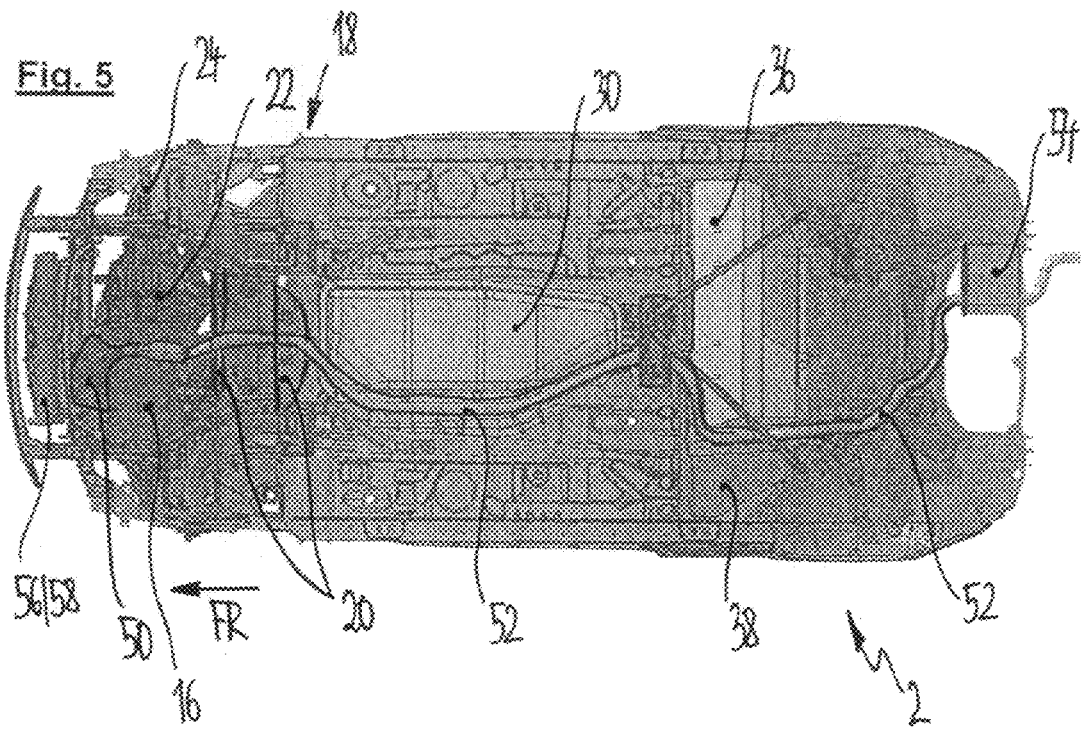
FIG. 5 is a bottom view of the exemplary motor vehicle according to the invention.

As illustrated in FIGS. 1 to 3 as well as FIG. 5, a fuel cell 20 is provided in the engine compartment 8 beside a transversely installed internal-combustion engine 16 in the area of a front wall 18, which front wall 18 separates the engine compartment 6 from the passenger compartment 8. The internal-combustion engines 16 drives the wheels 26 of the front axle 28 by way of a transmission 22 and drive shafts 24.

An accumulator 30 for storing electric energy is arranged in the area of the traditional transmission tunnel of the motor vehicle 2.

Two storage devices 36 and 38 for receiving fuels for the two drive assemblies 16 and 20 are provided in the area in front of the wheels 34 of the rear axle 32 of the motor vehicle and below the rear seat bench 15 in the area below the so-called heel sheet. Storage device 36 is a tank for hydrogen, while storage device 38 is a tank for gasoline, diesel or natural gas.

The rear wheels 34 of the rear axle 32 are driven by an electric motor 40 having a directly flanged-on transmission differential unit 42. A DC/DC converter 44, an inverter 46 as well as an electronic power unit, which is not shown, for controlling the electric motor 40 are situated above the rear axle 32 in the luggage compartment 12 of the motor vehicle 2.

As illustrated in detail in FIG. 3, the internal-combustion engine 16 is arranged transversely to the driving direction FR. The internal-combustion engine 16 is, for example, a four-cylinder in-line Otto engine. The internal-combustion engine 16 is fed with fuel from the tank 38. The internal-combustion engine 16 is arranged such that the exhaust gas manifold 50 of the exhaust system is situated on the front side of the internal-combustion engine 16. Thus, the thermal action upon the fuel cell 20 by the internal-combustion engine 16 is reduced. FIG. 5 illustrates the described arrangement of the exhaust gas manifold 50 as well as the course of an exhaust pipe 52 having a rear muffler section 54.

As illustrated in detail particularly in FIG. 5, the fuel cell 20 is arranged directly adjacent to the internal-combustion engine 16 but at a sufficient distance for inserting thermal insulation material. For this purpose, a distance of at least 30 mm is provided in order to ensure that the fuel cell will not exceed a temperature level of 60° C. Furthermore, a unit consisting of two heat exchangers 56 and 58 at the front side of the motor vehicle 2 is used for cooling various components of the motor vehicle 2, among others, including for cooling the fuel cell 20.

Figure 4:
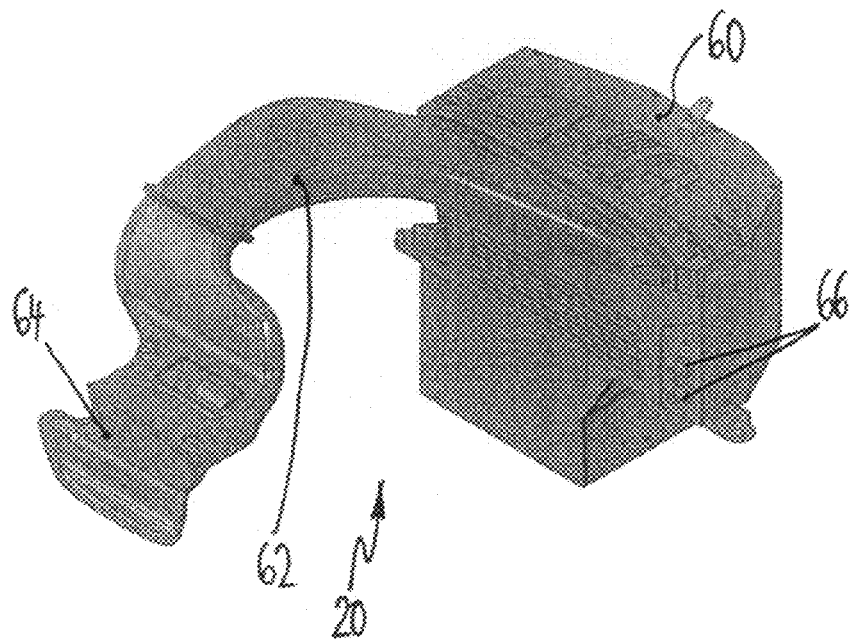
FIG. 4 is a perspective view of an exemplary fuel cell of the motor vehicle according to the invention.

The fuel cell 20 is illustrated in detail in FIG. 4. The fuel cell 20 has an essentially rectangular housing 60, with an air duct 62 and an air admission funnel 64 on the front side as well as pipe sockets 66 for the connection of coolant pipes. The fuel cell 20 illustrated as an example has a power of approximately 5 kW.

Figure 6:
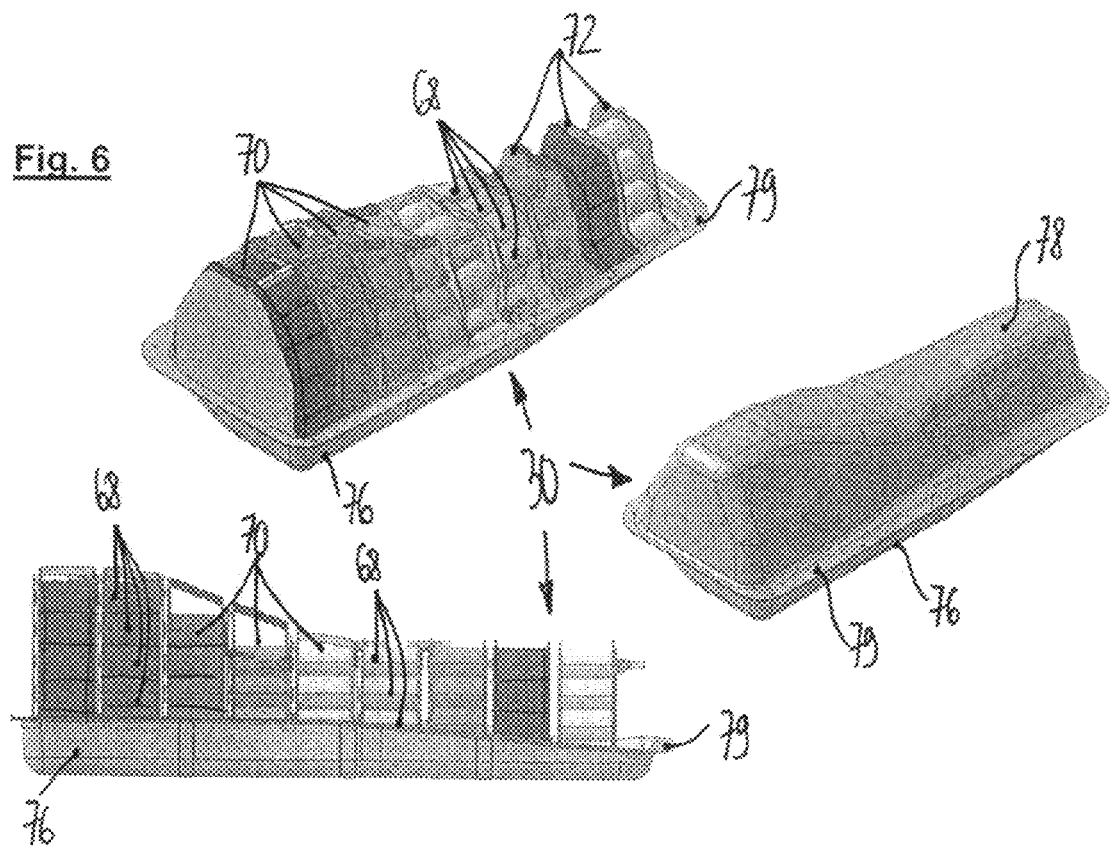
FIG. 6 are representations of an exemplary electric storage unit.

The individual representations of FIG. 6 are detailed views of the electric accumulator 30. The accumulator 30 is composed of a plurality of individual double-layer capacitors 68 which are combined to form stacks 70 and are mutually separated by way of separating walls 72. Corresponding to the available installation space in the area of the traditional transmission tunnel, a greater installation height of the accumulator 30 is possible in the front area of the transmission tunnel, thus, in an area into which a section of the transmission frequently projects in the case of motor vehicles of a conventional construction. In the present example, the accumulator 30 is formed by 148 individual double-layer capacitors 68 having a diameter of approximately 60 mm and a length of approximately 100 mm, each capacitor 68 having a capacitance of approximately 2,000 F respectively, resulting in a total maximal storage capacity of slightly more than 200 Wh. The individual capacitors 68 are accommodated in a housing 74 that is composed of a bottom shell 76 and a top shell 78 made of fiber-glass-reinforced plastic material. These shells 76 and 78 are connected with one another along flanges 79 in a sealingly closed manner to prevent entry of liquid and solid particles, and accommodate the capacitors 68 in their interior in a manner that protects them from outside influences. In the present embodiment, the accumulator 30, including the housing 74, requires a volume of approximately 80 $dm^3$.

Deviating from the illustrated embodiment, lithium ion batteries or other electric energy accumulator may naturally also be used.

Figure 7:
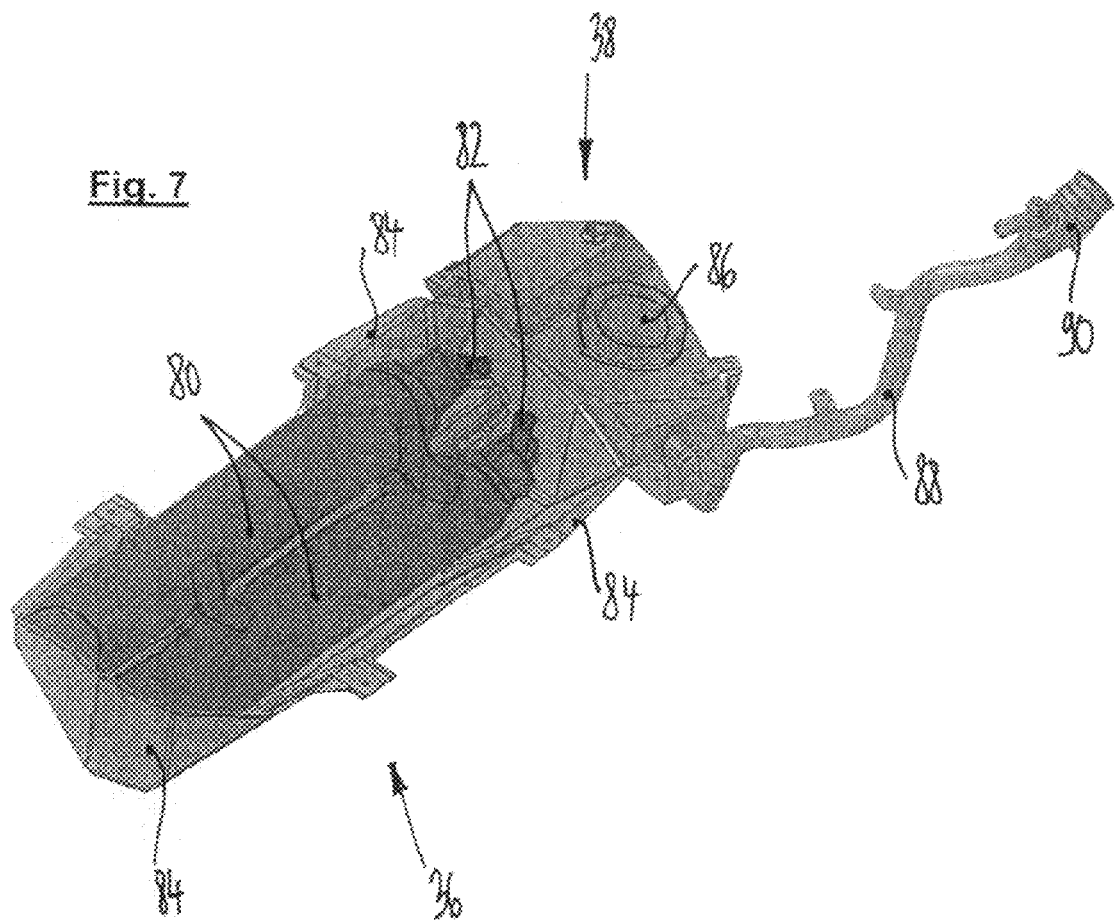
FIG. 7 is a perspective view of an exemplary tank for fuel for the motor vehicle according to the invention.

FIG. 7 is a detailed view of the storage devices 36 and 38. In the illustrated, particularly simple embodiment, the storage device 36 for receiving hydrogen is constructed in the shape of two gas cylinders 80. These commercially available so-called 10-liter bottles 80 each accommodate 140 g hydrogen at a pressure of 200 bar. On the basis of speed profiles of inner-city operations, this results in a range of approximately 30 km, in the case of a purely electric operation by way of the fuel cell 20. The two gas cylinders 80 are connected in parallel and can be filled by way of filling pipes, which are not shown and start at their valves 82, from outside the motor vehicle 2. The ends of the filling pipes preferably extend into the area of a conventional filler inlet compartment, so that an easy filling is possible from outside the motor vehicle 2. The two gas cylinders 80 are protected toward the underside of the motor vehicle 2 by an impact-resistant housing 84 made of a metallic material.

The embodiment according to FIG. 7 is a cost-effective solution which can naturally be optimized with respect to the quantity of storable hydrogen. Correspondingly, any storage device for hydrogen, such as a pressure tank made of CFCs with a filling pressure of 350 or 700 bar, a tank for liquid hydrogen, a cryopressure tank, etc., can be integrated in the above-described installation space in front of the rear axle 32 of the motor vehicle 2.

The storage device 38 for receiving fuel for the internal-combustion engine 16 is situated directly beside the storage device 36. The interior of the storage device 38 is easily accessible by way of a cap 86. In addition, FIG. 7 illustrates a filling pipe 88 whose end 90 facing away from the storage device ends in the above-described filler inlet compartment.

As indicated particularly in FIGS. 2 and 3, the "package" of the motor vehicle 2 ensures high suitability for daily use in that the transport capacity of the motor vehicle 2 is not significantly reduced compared with a conventional motor vehicle. The exemplary motor vehicle 2 according to the invention is distinguished by the fact that it can be operated free of emissions in areas within a city in that the electric energy, which is generated by the fuel cell 16 by the oxidation of the hydrogen that is carried along, is fed to the electric motor 40 directly or by way of an intermediate storage in the accumulator 30. In the case of a dimensioning of the internal-combustion engine 16 with, for example, approximately 75 to 90 kW as well as a maximal power output of the electric motor 40 of approximately 80 kW and a design of the fuel cell with an electric power of 5 kW, good driving performances and ranges are obtained in the case of a motor vehicle 2 with dimensions as illustrated in FIGS. 1 to 3 and FIG. 5, in inner-city traffic as well as during the operation of the motor vehicle 2 outside city areas, so that, as a whole, the motor vehicle 2 can be used for multiple purposes. In this case, it is significant that the fuel cell 20 is configured only as an auxiliary energy source, in order to permit the operation in the inner-city area with comparatively low power demands.

The invention can be summarized as follows. A motor vehicle 2 has two drive assemblies in the form of an internal-combustion engine 16 and an electric motor 40. A comparatively small-dimensioned fuel cell 20 provides electric energy for the operation of the motor vehicle 2 at low speeds, preferably in inner-city operation, which electric energy is fed to the electric motor 40 either directly and/or by way of an electric accumulator 30. Thus, the motor vehicle 2 can be moved without any emissions during the operation of the fuel cell 20 with hydrogen. For operation outside city areas, the internal-combustion engine 16 with a correspondingly higher output is available. Together with the internal-combustion engine 16, the fuel cell 20 is arranged in the engine compartment 4 of the motor vehicle 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    an engine compartment located at a front end section of the motor vehicle;
    first and second drive assemblies, wherein a first drive assembly comprises an internal-combustion engine and a second drive assembly comprises an electric motor;
    a fuel cell operatively configured to provide electric energy to the electric motor; and
    at least one tank for fuel for at least one of the fuel cell and the internal-combustion engine;
    wherein the internal-combustion engine and the fuel cell are arranged in the engine compartment at the front end section of the motor vehicle; and
    wherein the at least one tank is operatively arranged in an area directly in front of a rear axle of the motor vehicle.

2. The motor vehicle according to claim 1, wherein the internal-combustion engine is arranged transversely in the engine compartment relative to a driving direction of the motor vehicle.

3. The motor vehicle according to claim 1, further comprising:
    a thermal separator operatively configured to thermally separate the internal-combustion engine and the fuel cell from one another.

4. The motor vehicle according to claim 2, further comprising:
    a thermal separator operatively configured to thermally separate the internal-combustion engine and the fuel cell from one another.

5. The motor vehicle according to claim 2, further comprising:
    an exhaust gas manifold of the internal-combustion engine, the exhaust gas manifold being arranged on a side of the internal-combustion engine facing a forward driving direction; and
    wherein the fuel cell is arranged on a side of the internal-combustion engine facing away from the forward driving direction.

6. The motor vehicle according to claim 3, further comprising:
   an exhaust gas manifold of the internal-combustion engine, the exhaust gas manifold being arranged on a side of the internal-combustion engine facing a forward driving direction; and
   wherein the fuel cell is arranged on a side of the internal-combustion engine facing away from the forward driving direction.

7. The motor vehicle according to claim 1, further comprising:
   an electric energy store operatively configured for storing electric energy generated by the fuel cell.

8. The motor vehicle according to claim 5, further comprising:
   an electric energy store operatively configured for storing electric energy generated by the fuel cell.

9. The motor vehicle according to claim 7, wherein the electric energy store is arranged in a traditional transmission tunnel area of a motor vehicle.

10. The motor vehicle according to claim 8, wherein the electric energy store is arranged in a traditional transmission tunnel area of a motor vehicle.

11. The motor vehicle according to claim 1, wherein the internal-combustion engine is operatively configured to drive wheels of a front axle of the motor vehicle, and further wherein the electric motor is operatively configured to drive wheels of a rear axle of the motor vehicle, the electric motor being arranged adjacent to the rear axle.

12. The motor vehicle according to claim 1, further comprising:
   at least one of an electric power unit, a DC/DC converter, and an inverter operatively arranged in an area of a rear luggage compartment of the motor vehicle.

13. The motor vehicle according to claim 12, further comprising:
   at least one heat exchanger for a cooling medium used to cool at least one of the internal-combustion engine, the electric motor, the fuel cell, the electric power unit, the DC/DC converter, and the inverter; and
   wherein the heat exchanger is operatively arranged at the front end section of the motor vehicle.

14. A motor vehicle, comprising:
   an engine compartment located at a front end section of the motor vehicle;
   first and second drive assemblies, wherein a first drive assembly comprises an internal-combustion engine and a second drive assembly comprises an electric motor;
   a fuel cell operatively configured to provide electric energy to the electric motor;
   wherein the internal-combustion engine and the fuel cell are arranged in the engine compartment at the front end section of the motor vehicle, and
   wherein the internal-combustion engine is operatively configured to drive wheels of a front axle of the motor vehicle, and further wherein the electric motor is operatively configured to drive wheels of a rear axle of the motor vehicle, the electric motor being arranged adjacent to the rear axle.

15. The motor vehicle according to claim 14, further comprising:
   at least one tank for fuel for at least one of the fuel cell and the internal-combustion engine; and
   wherein the at least one tank is operatively arranged in an area directly in front of a rear axle of the motor vehicle.

16. A motor vehicle, comprising:
   an engine compartment located at a front end section of the motor vehicle;
   first and second drive assemblies, wherein a first drive assembly comprises an internal-combustion engine and a second drive assembly comprises an electric motor;
   a fuel cell operatively configured to provide electric energy to the electric motor; and
   a heat exchanger for a cooling medium used to cool the at least one of the internal-combustion engine, the electric motor, and the fuel cell;
   wherein the internal-combustion engine and the fuel cell are arranged in the engine compartment at the front end section of the motor vehicle; and wherein the heat exchanger is operatively arranged at the front end section of the motor vehicle.

17. The motor vehicle according to claim 16, further comprising:
   at least one tank for fuel for at least one of the fuel cell and the internal-combustion engine; and
   wherein the at least one tank is operatively arranged in an area directly in front of a rear axle of the motor vehicle.

18. The motor vehicle according to claim 16, wherein the internal-combustion engine is operatively configured to drive wheels of a front axle of the motor vehicle, and further wherein the electric motor is operatively configured to drive wheels of a rear axle of the motor vehicle, the electric motor being arranged adjacent to the rear axle.

* * * * *